June 1, 1965 W. A. BOOTHE 3,186,422
FLUID AMPLIFIER
Filed Dec. 31, 1962 3 Sheets-Sheet 1

Inventor:
Willis A. Boothe,
by Paul J. Frank
His Attorney.

June 1, 1965  W. A. BOOTHE  3,186,422
FLUID AMPLIFIER
Filed Dec. 31, 1962  3 Sheets-Sheet 2
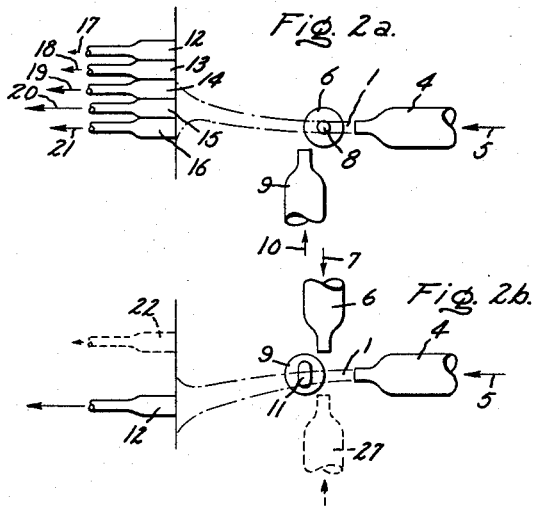
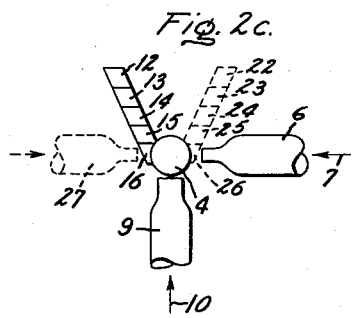
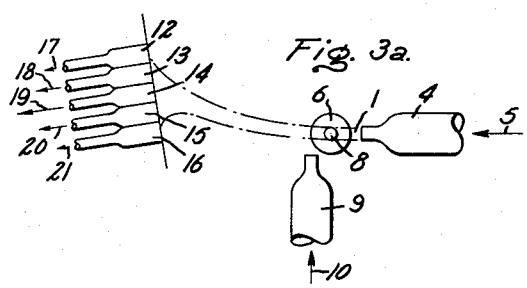
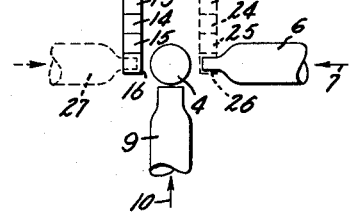
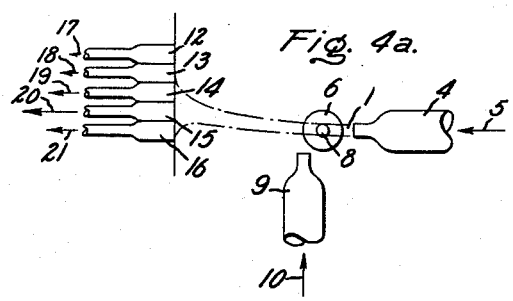
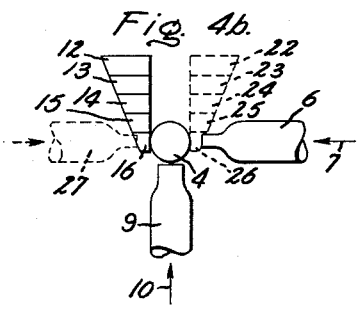
Inventor:
Willis A. Boothe,
by Paul A. Frank
His Attorney.

June 1, 1965  W. A. BOOTHE  3,186,422
FLUID AMPLIFIER
Filed Dec. 31, 1962  3 Sheets-Sheet 3
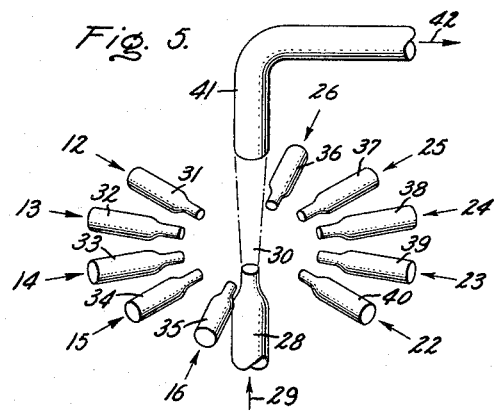
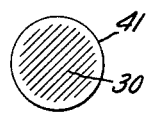
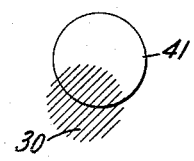
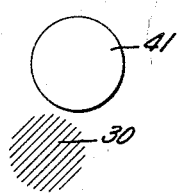
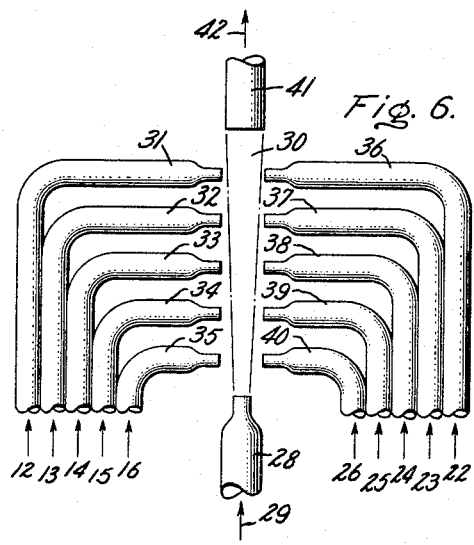
Inventor:
Willis A. Boothe,
by Paul A. Frank
His Attorney.

United States Patent Office 3,186,422
Patented June 1, 1965

3,186,422
FLUID AMPLIFIER
Willis A. Boothe, Scotia, N.Y., assignor to General
Electric Company, a corporation of New York
Filed Dec. 31, 1962, Ser. No. 248,631
10 Claims. (Cl. 137—81.5)

My invention relates to a fluid amplifier of the jet valve type which employs no moving parts, and in particular, to a variable gain fluid amplifier that utilizes an additional control jet and plurality of receivers to obtain the gain changing feature.

Fluid amplifiers have an important place in the fields of fluid power and control. In addition to serving as control devices, they are useful as analog and digital computing elements. Fluid amplifiers feature inherent reliability, low cost and moderate operating speed. They may be made from virtually any material that is non-porous and has structural integrity. As a result, they are ideal for applications where nuclear radiation, high temperature, vibration and shock may be present. The devices will operate on both incompressible fluids such as liquids and compressible fluids such as gases, including air.

Fluid amplifiers fall into two basic categories, the analog type and the digital type. Both types operate on the basis of deflecting a power jet. In the conventional form of either of these amplifiers, a constant main fluid flow comprising a relatively high pressure power jet issues from a power nozzle and impinges upon at least one of two fluid flow receivers. A deflection of the power jet is obtained by imparting sideways momentum thereto by means of a control fluid flow comprising a relatively low pressure control jet issuing from a pair of control nozzles positioned in opposing relationship to the power jet and generally perpendicular thereto. The magnitude of power jet deflection is proportional to the net sideways momentum imparted by the control jets in the analog valve. Deflection of the power jet results in one receiver obtaining more flow or receiving a higher pressure while the other receiver obtains or recovers less and since the deflection is proportional, the output flow or pressure at the receivers is proportional to the net input flow or pressure at the control nozzles.

The digital amplifier is generally a two position or on-off device. The jet deflection is effected by the sidewalls of the two receivers which are designed in a manner whereby the jet clings to one or the other but not to both sidewalls. This effect is brought about by the entrainment action of the jet itself. The power jet can be detached from a sidewall by introducing a control jet between the power jet and that sidewall, in which case the jet flips to the other side.

Fluid amplifiers of the analog and digital type have been known for some time but their use has been limited since they were all constant gain devices. Thus, in applications where a variable gain is required, such as in generating non-linear mathematical functions or generating mathematical functions of two variables, fixed gain fluid amplifiers have limited use. While obviously, a plurality of fluid amplifiers each having a dissimilar fixed gain may be employed with a switching means for selecting the desired amplifier gain, this technique is cumbersome, expensive, and introduces additional time delays into the circuit to accomplish the amplifier switching. Another technique to vary gain may employ a variable fluid flow input to the power jet, however, this device provides no amplification. Thus, a need exists for solving the problem of providing both amplification and variable gain in a fluid amplifier.

Therefore, one of the principal objects of my invention is to develop a new and improved variable gain fluid amplifier.

Another important object of my invention is to develop a new and improved variable gain fluid amplifier wherein the variable gain is determined by positioning a plurality of fluid flow receivers in a selected arrangement.

Sitll another object of my invention is to develop a new and improved two stage push-pull variable gain fluid amplifier wherein the first stage output comprises a plurality of fluid flow receivers disposed in a selected arrangement and the second stage input includes a plurality of control nozzles connected thereto.

A still further object of my invention is to develop a new and improved variable gain amplifier that may be adapted to function as a digital or analog fluid amplifier.

Briefly stated, and in accordance with one aspect of my invention, I provide a fluid amplifier that includes a power nozzle for producing a power jet and a pair of oppositely disposed control nozzles positioned adjacent the power nozzle for providing a controlled deflection of the power jet. In addition, I position a second control or gain changing nozzle adjacent the power nozzle for effecting a deflection of the power jet substantially perpendicular to the deflection developed by the pair of control nozzles. A plurality of fluid flow receivers are disposed downstream from the power nozzle and are positioned in a single plane and within selected flow paths described by the deflected power jet whereby each receiver determines a different gain for the fluid amplifier. The particular receiver in maximum fluid communication with the deflected power jet determines the gain of the amplifier, the gain being varied by varying the fluid flow or pressure supplied to the gain changing nozzle.

A second stage fixed or variable gain fluid amplifier may be provided by coupling the output of the plurality of first stage receivers to the inputs of a plurality of control nozzles in the second stage.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURES 2a, 2b, 2c illustrate a side view, top view and front end view respectively, of a first embodiment of a variable gain fluid amplifier constructed in accordance with my invention wherein gain is varied by varying distance between corresponding receivers;

FIGURES 3a, 3b, illustrate a side view and front end view respectively, of a second embodiment of a variable gain fluid amplifier wherein gain is varied by varying distance between the power nozzle and receiver;

FIGURES 4a, 4b illustrate a side view and front end view respectively, of a third embodiment of a variable gain fluid amplifier wherein gain is varied by varying the receiver width;

FIGURE 5 illustrates a second stage fixed gain fluid amplifier constructed in accordance with my invention;

FIGURES 5a, 5b, 5c illustrate the relationship of the power jet impact on the receiver in the second stage for various degrees of power jet deflection; and FIGURE 6 illustrates a second stage variable gain fluid amplifier constructed in accordance with my invention.

The gain of a fluid amplifier may be expressed as a pressure gain, mass flow gain or power gain. Pressure gain is the change in differential pressure betwen a pair of receivers for a particular change in differential pressure between a pair of oppositely disposed control nozzles. Mass flow gain is the change in differential fluid mass flow between a pair of receivers for a particular change in differential fluid mass flow into a pair of oppositely disposed control nozzles. Power gain is the product of pressure gain and mass flow gain.

Figure 1A:
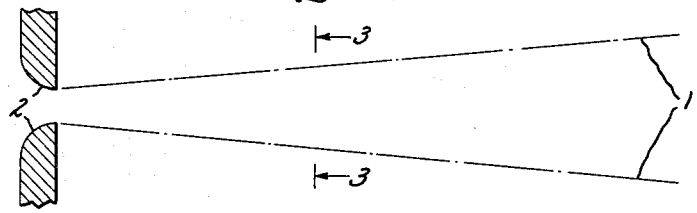
FIGURES 1a, 1b, 1c illustrate basic jet characteristics governing fluid amplifier operation.
Figure 1B:
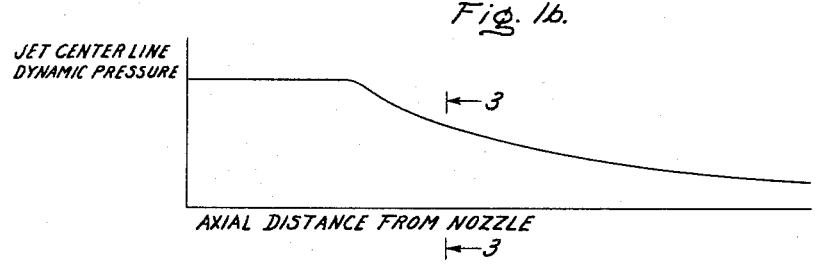
Figure 1C:
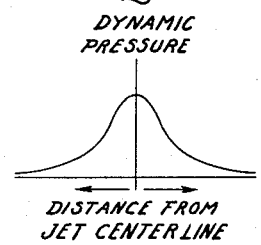

Referring particularly to the jet characteristics illustrated in FIGURE 1, there are shown the basic jet principles on which the devices of my invention are based. FIGURE 1a illustrates the general outline 1 of a conventional jet configuration issuing from nozzle 2. Jet 1 issues from nozzle 2 with approximately the same cross section as the cross section of the nozzle and then gradually expands in cross section with increasing distance axially from the nozzle, it being appreciated that the jet herein illustrated is unconfined. FIGURE 1b indicates the decrease in dynamic pressure (and velocity) at the center line of a jet with increasing distance axially from nozzle 2. FIGURE 1c illustrates the change of dynamic pressure (and velocity) of a jet with distance laterally from the center line thereof taken at a distance from the nozzle beyond the break point in FIGURE 1b, the particular distribution being indicated as taken on the plane of line 3—3 of FIGURES 1a and 1b. From FIGURES 1b and 1c, the following jet principles are evident:

(a) The slope of the curve of dynamic pressure (and velocity) versus lateral distance from the jet center line is a function of that lateral distance;

(b) The dynamic pressure (and velocity) decreases with distance axially from the nozzle;

(c) The width of a receiver determines the average dynamic pressure (and velocity) recovered at the receiver, the change in average pressure (and velocity) due to a lateral deflection of the jet varying inversely with the receiver width.

The gain of a fluid amplifier may be varied in accordance with principles (a), (b) and (c) described above. Since FIGURE 1c indicates that the slope of the pressure curve varies with distance laterally from the jet center line, principle (a), the gain of a fluid amplifier may be varied by changing the distance between a pair of fluid flow receivers. FIGURE 1b indicates that pressure varies directly with distance axially from the nozzle, principle (b), thus gain may also be varied by changing the distance between power nozzle and receivers. Finally, FIGURE 1c indicates that pressure varies inversely with distance laterally from the jet center line, principle (c), therefore it can be deduced that gain may also be varied by changing the width of the receivers.

A first embodiment of a variable gain jet valve fluid amplifier constructed in accordance with my invention employs the jet principle (a), the slope of the curve of pressure varies with distance laterally from the jet center line. FIGURE 2a illustrates a top view thereof and FIGURE 2c a front end view. A first passage means terminating in a fluid flow restrictor or power nozzle 4 has an input indicated by arrow 5, supplied with a fluid flow to be controlled. This fluid flow is supplied from a source of main fluid having relatively constant pressure and flow rate. The output of power nozzle 4 is a fluid flow in the form of a power jet 1 having substantially the same configuration as illustrated in FIGURE 1a. A second passage means terminating in a fluid flow restrictor or control nozzle 6 is positioned adjacent power nozzle 4 and substantially perpendicular to the axis thereof. The input to control nozzle 6, indicated by arrow 7, is connected to a first source of controllable fluid flow under pressure. The output of control nozzle 6 comprises a fluid flow in the form of a control jet 8 directed in intersecting relationship to power jet 1. The control jet effects a first controllable deflection of the power jet in the direction of the control jet, the deflection being proportional to the fluid flow or pressure input to control nozzle 6. Thus, increasing the fluid flow or pressure to the input of control nozzle 6 increases the deflection of power jet 1.

A third passage means terminating in a fluid flow restrictor or additional control nozzle 9 is also disposed adjacent power nozzle 4 and positioned substantially perpendicular to the axis thereof and also substantially perpendicular to the axis of control nozzle 6. This additional control nozzle obtains a gain changing characteristic for the fluid amplifier and thus will be referred to as a gain changing nozzle. The input to gain changing nozzle 9, indicated by arrow 10, is connected to a second source of controllable fluid flow under pressure. The output of nozzle 9 comprises a fluid flow in the form of a control or gain changing jet 11 directed in intersecting relationship to power jet 1 and in a direction substantially perpendicular to control jet 8. Gain changing jet 11 effects a second controllable deflection of the power jet in the direction of the gain changing jet, the deflection being proportional to the fluid flow or pressure input to nozzle 9. A plurality of fluid flow receiving or output means, commonly referred to as fluid flow receivers 12, 13, 14, 15, and 16 are positioned remote and downstream from power nozzle 4 and remote from control nozzles 6 and 9. The inlets to the receivers may be in juxtaposed relationship, as shown or spaced apart to form a single row within a single plane. The outlets of the fluid flow receivers, indicated by arrows 17, 18, 19, 20 and 21 may pass to a second stage of fluid amplification as will be described hereinafter. In the embodiment illustrated in FIGURE 2, fluid receivers 12 through 16 have equal widths and equal cross sectional areas and are preferably disposed in a plane substantially perpendicular to the axis of the power nozzle and substantially parallel to the gain changing nozzle axis and at distances progressively varying from the power nozzle axis in the direction of the control and gain changing jets.

The particular disposition of the plane containing the receivers being as hereinabove recited is not to be deemed a limitation of my invention. The recited configuration is preferred, but the plane may be disposed an angles other than 90° to the power nozzle axis while remaining substantially parallel to the gain changing nozzle axis. Also, control nozzle 6 and gain changing nozzle 9 need not be perpendicular to the power nozzle axis, although this configuration is also the preferred one since the most efficient utilization of the control jets is obtained therefrom.

A more efficient amplifier producing a higher gain, may be achieved by providing a second group or row of corresponding receivers within the same plane as the first row and arranged in symmetrical relationship to the power nozzle axis. Thus, in FIGURE 2c, the two rows form a general V-shape, the second row being indicated in phantom as receivers 22, 23, 24, 25 and 26. A still more efficient amplifier is a push-pull arrangement obtained by also providing a second control nozzle 27, indicated in phantom, positioned in opposing relationship to nozzle 6. In these more efficient amplifiers, the nondeflected power jet is preferably directed midway between the two receiver groups and toward the converging ends of the V-shape.

The various nozzles and receivers may be constructed of glass, plastic, metal or any other material suitable for conveying a fluid. The nozzles and receivers may be located in an open atmosphere or enclosed within a containing means in which a passage means increasing in cross sectional area from the power nozzle to the receivers may be utilized as an integral portion of the container. In this latter case, suitable vents must be provided to prevent attachment of the fluid to a sidewall of the passage means. The nozzles and receivers may have any of a number of forms in cross section, circular or rectangular being preferred.

The operation of the variable gain fluid amplifier illustrated in FIGURE 2 is as follows:

At quiescent conditions, the input to control nozzles 6 and 27 is either zero or an equal flow or pressure whereby power jet 1 is nondeflected in a lateral direction. Since the power jet expands in cross section as it traverses the distance to the plane of the receivers, as disclosed in FIGURE 1a, particular receivers may be in fluid communication with the power jet. Thus as indicated in FIGURE 2c, receivers 16 and 26 would be in substantial and equal fluid communication with the power jet, and receivers 15 and 25 would be in a lesser but equal fluid communication therewith. Depending upon the cross sectional area of the power jet at the receiver plane, the receiver cross sectional area, and distance between corresponding receivers in each row, additional receivers may also receive a lesser portion of the power jet. This result is indicated by the length of the arrows 17 through 21 indicating the relative output of the receivers. The result is a net zero output from the receivers since the effect of the outputs from each pair of corresponding receivers is a cancelling one.

An unequal or unbalanced fluid flow or pressure at the input of control nozzles 6 and 27 produces unequal or unbalanced control jets issuing from nozzles 6 and 27. The combining of the unequal control jets, being in opposing relationship, may be considered as a resultant control jet which effects a resultant lateral deflection of the power jet in the direction of the larger control jet. With no fluid flow to the input of gain changing nozzle 9, or with the fluid flow remaining constant thereto, a single or selected ones of the receivers in one particular row are in substantial communication with the particular flow path described by the deflected power jet. Thus as shown in FIGURES 2a and 2b, receivers 14, 15 and 16 receive substantially more of the total flow from the deflected power jet than oppositely disposed receivers 24, 25 and 26. The gain of the amplifier may easily be determined at this condition by measuring the change in differential pressure or fluid mass flow between corresponding receivers 15 (having maximum communication with the power jet) and 25 for a predetermined change in differential pressure or fluid mass flow between control nozzles 6 and 27. It should be observed that this determined gain is dependent on the lateral distance or spacing between receivers 15 and 25. The combination of power nozzle 4, control nozzles 6 and 27 and receivers 15 and 25 comprise a fixed gain fluid amplifier, the gain being fixed since the lateral deflection of the power jet as sensed by the receivers is, within limits, directly proportional to the input supplied to the control nozzles.

Introducing a fluid flow under pressure to gain changing nozzle 9, or varying an existing flow thereto results in a controlled defletcion of the power jet in a direction perpendicular to the deflection effected by control nozzles 6 and 27. The power jet may thus be deflected both laterally and vertically from the axis of the power nozzle. As the power jet deflected laterally and vertically upward in FIGURE 2c, a substantially greater change in differential pressure or fluid mass flow must be developed at control nozzles 6 and 27 to achieve the corresponding change in differential pressure or fluid mass flow measured previously between receivers 15 and 25, thus reducing the gain. The output of the gain changing nozzle thus provides a means for impinging the power jet on variably spaced apart receivers, that is, a means for effectively varying the spacing between receivers. The gain of this amplifier is determined by the lateral distance or spacing between corresponding receivers in the two rows. The particular gain is determined by the receiver in maximum fluid communication with the deflected power jet, this receiver being determined by the particular output of gain changing nozzle 9. The gain of the amplifier may thus be varied by varying the distance between receivers in the embodiment illustrated in FIGURE 2, the gain decreasing with increased distance between receivers. In the case of a single control nozzle, single row of receivers arrangement, the gain is varied by varying the distance laterally in the direction of the control jet from the axis of the power nozzle to the receivers.

A second embodiment of a variable gain fluid amplifier is illustrated in FIGURE 3 wherein FIGURE 3a illustrates a side view and FIGURE 3b a front end view taken from the power nozzle end. The relative positions of power nozzle 6, control nozzles 6 and 27 and gain changing nozzle 9 may be identical to that illustrated in the embodiment shown in FIGURE 2. The primary distinction between the two embodiments occurs in the disposition of the receivers. The plane containing the receivers in the embodiment of FIGURE 3 is angularly displaced from the perpendicular to the axis of power nozzle 6 and also angularly displaced from the parallel to gain changing nozzle 9 if said nozzle is perpendicular to the power nozzle axis. The receivers in each group are disposed at distances progressively varying from the axis of the power nozzle in the direction of the gain changing jet only, that is, the two groups of receivers are arranged in two vertical and parallel rows. Thus there is no change in spacing between corresponding receivers in the embodiment as distinguished from the embodiment of FIGURE 2. The receivers are of equal width and cross sectional area as in the case of the FIGURE 2 embodiment. In an analog amplifier application, the two rows of receivers are spaced apart as illustrated in FIGURE 3b, while in a digital amplifier application the two rows are juxtapositioned. In the FIGURE 3 embodiment, the gain changing nozzle 9 output thus provides a means for effectively varying the longitudinal or axial spacing between power nozzle 4 and the receivers. Varying this longitudinal distance determines the dynamic pressure of the deflected power jet at the receiver in accordance with FIGURE 1b and thus varies the gain. The gain of the amplifier may thus be varied by varying the distance between power nozzle and receivers in the embodiment illustrated in FIGURE 3, the gain decreasing with increased distance.

A third embodiment of a variable gain jet valve fluid amplifier is illustrated in FIGURE 4 wherein FIGURE 4a illustrates a side view and FIGURE 4b a front end view. The relative positions of power nozzle 6, control nozzles 6 and 27 and gain changing nozzle 9 may be identical to that illustrated in the embodiment shown in FIGURES 2 and 3. The receivers are positioned in a plane substantially perpendicular to the axis of the power nozzle as in FIGURE 2, the two groups of receivers being equally spaced apart as in FIGURE 3. The primary distinction between this embodiment of those of FIGURES 2 and 3 is that the receivers have unequal widths and corresponding unequal cross sectional areas as indicated in FIGURE 4b. In an analog amplifier application, the two rows of receivers are spaced apart as illustrated in FIGURE 4b, while in a digital amplifier application the two rows are juxtapositioned. The gain changing nozzle 9 output thus provides a means for effectively varying the receiver widths. Varying the receiver width determines the average dynamic pressure of the deflected power jet recovered at the receivers in accordance with FIGURE 1c and thus varies the gain. The gain of the amplifier may thus be varied by varying the width of the receivers in the embodiment illustrated in FIGURE 4, the gain decreasing with increased width.

A multi-input fixed gain fluid amplifier suitable for coupling to the output of the variable gain amplifier illustrated in FIGURES 2, 3 and 4 is shown in FIGURE 5. This multi-input amplifier would thus operate as a second stage amplifier. A power nozzle 28 is supplied with a relatively constant fluid flow to be controlled and indicated by arrow 29. This fluid flow is supplied at a relatively constant pressure. The output of power nozzle 28 comprises a fluid flow in the form of a power jet 30. A plurality of passage means or control nozzles 31 through 40 are circularly disposed in a plane perpendicular to the axis of the power nozzle 28 and in symmetrical converging relationship to the power jet. The inputs to control nozzles 31 through 40 are connected respectively to the outputs of receivers 12 through 16 and 22 through 26 of the variable gain amplifier illustrated in FIGURE 2, 3 or 4. Since control nozzles 31 through 40 are arranged by pairs in symmetrical opposing relationship in the same manner as the receivers of the first stage amplifier, the control fluid flows inputs to control nozzles 31 through 40 are thus equal during quiescent conditions of the first stage variable gain amplifier whereby power jet 30 is nondeflected, and are unequal during the nonquiescent state of the variable gain amplifier whereby unbalanced control inputs occur and power jet 30 is deflected. A fluid flow output means or receiver 41 is positioned downstream from power nozzle 28 for receiving substantially the total flow of power jet 30 in its nondeflected state as illustrated in FIGURE 5a, and receiving substantially zero flow when the power jet is fully deflected as indicated in FIGURE 5c. For intermediate values of deflection of the power jet, receiver 41 will be in partial fluid communication with the power jet, the degree of communication being proportional to the unbalance of unequal control jets issuing from control nozzles 31 through 40.

In the nonquiescent state of the first stage variable gain amplifier, control jets issue from either all of control nozzles 31 through 40 with adjacent selected ones of these control nozzles issuing substantially greater magnitude control jets than those from oppositely disposed control nozzles, or, the control jet issues only from a selected one or adjacent selected control nozzles as determined by the first stage variable gain amplifier output, to produce a controlled deflection of power jet 30. Suitable passage means or ducts may be employed to connect the output of the receivers of the first stage variable gain amplifier to the input of the control nozzles in the second stage fixed gain amplifier when the two amplifiers are disposed remote from each other. The inputs to the control nozzles are indicated by arrows and appropriate numerals which indicate the respective receivers of the first stage variable gain amplifier whose output is connected thereto. The output of receiver 41, indicated by arrow 42 may be connected to a fluid actuating element in the final fluid power stage of the control or computer device.

The second stage amplifier illustrated in FIGURE 5 has only one output. A push-pull output may be obtained by the following arrangement of the first and two second stage amplifiers. The outputs of one of the rows of receivers from the first stage are connected to control nozzles on one semicircular side of the power jet of a first second stage amplifier. The outputs of the second row of receivers are connected to control nozzles on the other semicircular side of the power jet of a second second-stage amplifier. The outputs of the single receivers in each second stage amplifier, when combined in a third stage as control inputs, operate in push-pull arrangement.

A second embodiment of a second stage multi-input fluid amplifier that is appropriate to be coupled to the output of the variable gain amplifier illustrated in FIGURES 2, 3 and 4 is shown in FIGURE 6. This particular second stage amplifier is a variable gain device. The power nozzle 28 and receiver 41 are disposed in the same relationship as that indicated in FIGURE 5. However, the plurality of control nozzles 31 through 40 are disposed in two groups longitudinally along two opposite sides of power jet 30 wherein each control nozzle in a first group is directed against the power jet in opposing relationship to a control nozzle in the second group. The inputs to the plurality of control nozzles are indicated by arrows and the appropriate numeral indicating the respective receivers of the first stage variable gain amplifier whose output is connected thereto. Since a greater deflection of a power jet is developed from a control jet positioned adjacent the power nozzle rather than positioned remote therefrom, the inputs to control nozzles 31 through 40 are connected to the receivers of the first stage variable gain amplifier in a manner whereby the lowest gain receivers 12 and 22 are positioned most remote from power nozzle 28 and the highest gain receivers 16 and 26 are positioned closest thereto. The variable gain amplifier illustrated in FIGURE 6 may be modified to a push-pull amplifier by positioning a second receiver adjacent receiver 41.

From the foregoing description, it can be appreciated that my invention makes available a new variable gain first stage fluid amplifier and an improved multi-input fluid amplifier which may be coupled to the variable gain amplifier to form a two-stage amplifier. The amplifiers may be used as analog amplifiers and the variable gain embodiments illustrated in FIGURES 3 and 4 may also be employed as digital amplifiers by juxtapositioning the two groups of receivers. The features of low cost due to the variety of materials that the nozzles and receivers may be constructed and the inherent long life of the amplifiers due to the absence of any moving parts therein makes these devices highly desirable in fluid power and control applications.

Having described three embodiments of a new variable gain first stage fluid amplifier and two embodiments of an improved multi-input fluid amplifier, it is believed obvious that modifications and variations of my invention are possible in the light of the above teachings. Thus, the receivers, especially those illustrated in FIGURES 3b and 4b, may be disposed horizontally or at an arbitrary angle rather than vertically, with appropriate changes in the disposition of the control and gain changing nozzles. The power and control nozzles may correspondingly be disposed at angles other than illustrated, it being understood that the preferable orientation of the nozzles is a substantially perpendicular disposition of the control nozzles with respect to the axis of the power nozzle and a perpendicular relationship between the control nozzles and gain changing nozzle. It is therefore, to be understood that changes may be made in the particular embodiments of my invention described which are within the full intended scope of the invention as defined by the following claims.

What I claim as new and desire to secure by Letters Patent of the United States is:

1. The combination of a fixed gain fluid amplifier comprising a first passage means terminating in a fluid flow restrictor for generating a jet of main fluid to be controlled, a plurality of fluid receiving means arranged in two straight rows and disposed downstream from said restrictor for receiving fluid from the main jet, and control passage means each terminating in a fluid flow restrictor for generating a jet of control fluid for controllably deflecting said main jet relative to said receiving means, with
   a passage means terminating in a fluid flow restrictor for generating a fluid jet for further controllably deflecting said main jet relative to said receiving means, the further deflection being in a direction substantially perpendicular to the deflection produced by said control jet whereby the gain of the fluid amplifier may be varied.

2. A variable gain fluid amplifier comprising
   a first passage means for supplying a fluid flow comprising a power jet,
   at least one second passage means adjacent said first passage means for supplying fluid flows comprising first control jets in intersecting relationship to the power jet for controllably deflecting said power jet in a first direction,
   a third passage means adjacent said first passage means and disposed substantially perpendicular to said second passage means for supplying a fluid flow comprising a second control jet in intersecting relationship to the power jet for controllably deflecting said power jet in a direction substantially perpendicular to said first direction, and
   a plurality of fluid receiver means downstream from said first passage means for receiving the power jet, said receiver means positioned in a plane substantially parallel to the axis of said third passage means, said receiver means forming at least one row of receiver means, said receiver means disposed at distances progressively increasing from the axis of the first passage means in the directions of said first and second control jets whereby said deflected power jet may be directed into at least a selected one of said receiver means as determined by the magnitude of said second control jet, each receiver means determining a particular gain of the fluid amplifier.

3. A variable gain fluid amplifier comprising a power nozzle for generating a main fluid jet to be controlled, a pair of control nozzles adjacent said power nozzle and disposed on opposite sides of said main fluid jet for generating a pair of opposed jets of control fluid in intersecting relationship to said main fluid jet for controllably deflecting said main fluid jet in a first direction determined by the relative magnitudes of the control jets, a third control nozzle adjacent said power nozzle and disposed substantially perpendicular to said pair of control nozzles for generating a third jet of control fluid in intersecting relationship to the main fluid jet for controllably deflecting said main fluid jet in a direction substantially perpendicular to said first direction, and a plurality of fluid receivers downstream from said power nozzle for receiving the main fluid jet, said receivers positioned in a plane substantially perpendicular to the axis of said power nozzle, said receivers forming two rows of corresponding receivers disposed at distances progressively increasing from the axis of the power nozzle in the direction of the third control jet modified by the pair of control jets to form a general V-shape of increasingly spaced-apart receivers whereby the deflected main fluid jet may be in fluid communication with at least a selected one of the receivers as determined by the magnitude of the third control jet, said receivers each having equal width dimensions, each pair of corresponding receivers from the two rows determining a particular gain of the fluid amplifier, the amplifier gain decreasing with increasing distance between corresponding receivers.

4. A variable gain fluid amplifier comprising a first passage means for supplying a fluid flow comprising a power jet, at least one second passage means adjacent said first passage means for supplying fluid flows comprising first control jets in intersecting relationship to the power jet for controllably deflecting said power jet in a first direction, a third passage means adjacent said first passage means and disposed substantially perpendicular to said second passage means for suplying a fluid flow comprising a second control jet in intersecting relationship to the power jet for controllably deflecting said power jet in a direction substantially perpendicular to said first direction, and a plurality of fluid receiver means downstream from said first passage means for receiving the power jet, said receiver means positioned in a plane angularly displaced from the axis of said third passage means, said receiver means forming at least one row of receiver means, said receiver means disposed at distances progressively increasing from the axis of the first passage means in the direction of the second control jet whereby said deflecting power jet may be directed into at least a selected one of said receiver means as determined by the magnitude of said second control jet, each receiver means determining a particular gain of the fluid amplifier.

5. A variable gain fluid amplifier comprising a power nozzle for generating a main fluid jet to be controlled, a pair of control nozzles adjacent said power nozzle and disposed on opposite sides of said main fluid jet for generating a pair of opposed jets of control fluid in intersecting relationship to said main fluid jet for controllably deflecting said main fluid jet in a first direction determined by the relative magnitudes of the control jets, a third control nozzle adjacent said power nozzle and disposed substantially perpendicular to said pair of control nozzles for generating a third jet of control fluid in intersecting relationship to the main fluid jet for controllably deflecting said main fluid jet in a direction substantially perpendicular to said first direction, and a plurality of fluid receivers donwnstream from said power nozzle for receiving the main fluid jet, said receivers positioned in a plane angularly displaced from the perpendicular to the axis of said power nozzle, said receivers forming two parallel rows of corresponding receivers disposed at distances progressively increasing from the axis of the power nozzle in the direction of the third control jet and also progressively increasing axially from the power nozzle whereby the deflected main fluid jet may be in fluid communication with at least a selected one of the receivers as determined by the magnitude of the third control jet, said receivers each having equal width dimensions, each pair of corresponding receivers from the two rows determining a particular gain of the fluid amplifier, the amplifier gain decreasing with increasing distance between the power nozzle and corresponding receivers.

6. A variable gain fluid amplifier comprising first passage means for supplying a fluid flow comprising a power jet, at least one second passage means adjacent said first passage means for supplying fluid flows comprising first control jets in intersecting relationship to the power jet for controllably deflecting said power jet in a first direction, a third passage means adjacent said first passage means and disposed substantially perpendicular to said second passage means for supplying a fluid flow comprising a second control jet in intersecting relationship to the power jet for controllably deflecting said power jet in a direction substantially perpendicular to said first direction, and a plurality of fluid receiver means downstream from said first passage means for receiving the power jet, said receiver means positioned in a plane substantially parallel to the axis of said third passage means, said receiver means forming at least one row of receiver means, said receiver means disposed at distances progressively increasing from the axis of the first passage means in the direction of said second control jet whereby said deflected power jet may be directed into at least a selected one of said receiver means as determined by the magnitude of said second control jet, each receiver means determining a particular gain of the fluid amplifier.

7. A variable gain fluid amplifier comprising a power nozzle for generating a main fluid jet to be controlled, a pair of control nozzles adjacent said power nozzle and disposed on opposite sides of said main fluid jet for generating a pair of opposed jets of control fluid in intersecting relationship to said main fluid jet for controllably deflecting said main fluid jet in a first direction determined by the relative magnitudes of the control jets, a third control nozzle adjacent said power nozzle and disposed substantially perpendicular to said pair of control nozzles for generating a third jet of control fluid in intersecting relationship to the main fluid jet for controllably deflecting said main fluid jet in a direction substantially perpendicular to said first direction, and a plurality of fluid receivers downstream from said power nozzle for receiving the main fluid jet, said receivers positioned in a plane substantially perpendicular to the axis of said power nozzle, said receivers forming two parallel rows of corresponding receivers disposed at distances progressively increasing from the axis of the power nozzle in the direction of the third control jet whereby the deflected main fluid jet may be in fluid communication with at least a selected one of the receivers as determined by the magnitude of the third control jet, said receivers having unequal width dimensions increasing in width in the direction of the third control jet, each pair of corresponding receivers from the two rows determining a particular gain of the fluid amplifier, the amplifier gain decreasing with increasing receiver width dimension.

8. A two stage fluid amplifier circuit comprising
a first stage variable gain fluid amplifier comprising
 a first power nozzle for generating a first power jet of fluid,
 a pair of control nozzles adjacent said first power nozzle and disposed on opposite sides of said first power jet for generating a pair of opposed control jets of fluid in intersecting relationship to said first power jet for controllably deflecting said first power jet in a first direction determined by the relative magnitudes of the control jets,
 a third control nozzle adjacent said first power nozzle and disposed substantially perpendicular to said pair of control nozzles for generating a third control jet of fluid in intersecting relationship to said first power jet for controllably deflecting said first power jet in a direction substantially perpendicular to said first direction, and
 a plurality of fluid receivers downstream from said first power nozzle for receiving the first power jet, said receivers forming two rows of corresponding receivers in a plane,
two second stage fixed gain fluid amplifiers each comprising
 a second power nozzle for generating a second power jet of fluid,
 a plurality of control nozzles adjacent said second power nozzle and equal in number to the number of receivers in one row in said first stage amplifier and disposed in at least a semicircular arrangement about the second power jet in a plane substantially perpendicular to the axis of the second power nozzle for generating control jets of fluid in intersecting relationship to said second power jet for controllable deflecting said second power jet, input connections to a semicircular arrangement of said plurality of control nozzles in a first of the second stage amplifiers provided from outputs of a first of two rows of receivers in said first stage amplifier, input connections to a symmetrically opposing semicircular arrangement of said plurality of control nozzles in a second of the second stage amplifiers provided from outputs of a second of said two rows of receivers in said first stage amplifier, and
 a fluid receiver downstream from each said second power nozzle for receiving the second power jets whereby the two fluid receivers in said second stage amplifiers form a push-pull output.

9. A variable gain fluid amplifier comprising
 a power nozzle for generating a jet of fluid to be controlled,
 a plurality of control nozzles arranged in two groups longitudinally disposed along the power jet on opposite sides thereof for generating jets of control fluid in intersecting relationship to the power jet for controllably deflecting said power jet in a direction determined by the relative magnitudes of the control jets, each of said two groups comprising a plurality greater than two and
 fluid receiver means downstream from said power nozzle and aligned therewith for receiving the power jet.

10. A two stage fluid amplifier circuit comprising
a first stage variable gain fluid amplifier comprising
 a power nozzle for generating a power jet of fluid,
 a pair of control nozzles adjacent said power nozzle and disposed on opposite sides of said power jet for generating a pair of opposed control jets of fluid in intersecting relationship to said power jet for controllably deflecting said power jet in a first direction determined by the relative magnitude of the control jets,
 a third control nozzle adjacent said power nozzle and disposed substantially perpendicular to said pair of control nozzles for generating a third control jet of fluid in intersecting relationship to said power jet for controllably deflecting said power jet in a direction substantially perpendicular to said first direction, and
 a plurality of fluid receivers downstream from said power nozzle for receiving the power jet, said receivers forming two rows of corresponding receivers in a plane,
a second stage variable gain fluid amplifier comprising
 a second power nozzle for generating a second power jet of fluid,
 a plurality of control nozzles arranged in two groups longitudinally disposed along the second power jet on opposite sides thereof for generating control jets of fluid in intersecting relationship to the second power jet for controllably deflecting said second power jet in a direction determined by the relative magnitude of the control jets in the second stage amplifier, input connections to the plurality of control nozzles disposed on a first side of said second power jet provided from outputs of a first of said two rows of receivers in said first stage amplifier, input connections to the plurality of control nozzles disposed on the opposite side of said second power jet provided from outputs of a second of said two rows of receivers in said first stage amplifier, and
 fluid receiver means downstream from said second power nozzle for receiving the second power jet.

References Cited by the Examiner

UNITED STATES PATENTS

| | | | |
|---|---|---|---|
| 1,628,723 | 5/27 | Hall | 200—81 |
| 3,024,805 | 3/62 | Horton | 137—610 XR |
| 3,071,154 | 1/63 | Cargill et al. | 137—83 XR |
| 3,124,160 | 3/64 | Zilberfarb | 137—81.5 |

LAVERNE D. GEIGER, *Primary Examiner.*